(12) United States Patent
Törncrona et al.

(10) Patent No.: US 10,100,199 B2
(45) Date of Patent: Oct. 16, 2018

(54) METHYLSILYL DERIVATISED SILICA PARTICLES, COLLOIDS, METHODS FOR MANUFACTURE AND KITS COMPRISING THE SAME

(71) Applicant: Akzo Nobel Chemicals International B.V., Arnhem (NL)

(72) Inventors: Anders Törncrona, Bohus (SE); Peter Daniel Hell, Borås (SE); Peter Harry Johan Greenwood, Göteborg (SE)

(73) Assignee: AKZO NOBEL CHEMICALS INTERNATIONAL B.V., Arnhem (NL)

( * ) Notice: Subject to any disclaimer, the term of this patent is extended or adjusted under 35 U.S.C. 154(b) by 0 days.

(21) Appl. No.: 15/557,143

(22) PCT Filed: Mar. 9, 2016

(86) PCT No.: PCT/EP2016/054971
§ 371 (c)(1),
(2) Date: Sep. 11, 2017

(87) PCT Pub. No.: WO2016/142404
PCT Pub. Date: Sep. 15, 2016

(65) Prior Publication Data
US 2018/0044531 A1 Feb. 15, 2018

(30) Foreign Application Priority Data
Mar. 12, 2015 (EP) .................... 15158725

(51) Int. Cl.
*C09C 1/30* (2006.01)
*C09D 5/00* (2006.01)
*C09D 1/00* (2006.01)

(52) U.S. Cl.
CPC .............. *C09C 1/3081* (2013.01); *C09D 1/00* (2013.01); *C09D 5/002* (2013.01)

(58) Field of Classification Search
CPC .......... C09C 1/3081; C09D 5/002; C09D 1/00
See application file for complete search history.

(56) References Cited

U.S. PATENT DOCUMENTS

| | | |
|---|---|---|
| 2010/0181322 A1 | 7/2010 | Perillon et al. |
| 2010/0242799 A1 | 9/2010 | Kim |
| 2011/0174826 A1 | 7/2011 | Le Bris et al. |
| 2011/0293950 A1 | 12/2011 | Kim |
| 2013/0014944 A1 | 1/2013 | Mazyar et al. |

FOREIGN PATENT DOCUMENTS

| | | |
|---|---|---|
| EP | 2 048 116 A1 | 4/2009 |
| WO | 2007/104258 A1 | 9/2007 |

OTHER PUBLICATIONS

Lee et al., "Coating of Methyltriethoxysilane—Modified Colloidal Silica on Polymer Substrates for Abrasion Resistance," Journal of Sol-Gel Science and Technology 24, pp. 175-180, (2002).
Sears, "Determination of Specific Surface Area of Colloidal Silica by Titration with Sodium Hydroxide," Analytical Chemistry vol. 28, No. 12, (1956), pp. 1981-1983.
Iler et al, "Degree of Hydration of Particles of Colloidal Silica in Aqueous Solution," J. Phys. Chem. vol. 60 (1956), pp. 955-957.
International Search Report and Written Opinion for PCT/EP2016/054971, dated Apr. 28, 2016.
European Search Report for 15158725.0-1355 dated Sep. 15, 2015.
International Preliminary Report on Patentability for PCT/EP2016/054971, dated Feb. 8, 2017.

*Primary Examiner* — Melvin C. Mayes
*Assistant Examiner* — Michael Forrest
(74) *Attorney, Agent, or Firm* — Matthew J. DeRuyter (57) ABSTRACT

Methylsilyl derivatized silica particles are disclosed. The methylsilyl derivatized silica particles have a methylsilyl content in a range of between 1-6 µmol $m^{-2}$ on a surface of the silica particles. Colloidal silica comprising the methylsilyl derivatized silica particles is also disclosed. Methods for the manufacture of the methylsilyl derivatized silica particles are disclosed. Kits for coatings comprising the methylsilyl derivatized silica particles are also disclosed.

16 Claims, 3 Drawing Sheets

FIG. 1

| SERIE 1 & 3 Coat | Pencil hardness | Adherence 1 mm | Adherence 2 mm |
|---|---|---|---|
| A+B | | | |
| A1+B1 | | | |
| A2+B2 | | | |
| A3+B3 | | | |
| A4+B4 | | | |
| D+B | | | |
| D1+B1 | | | |
| D2+B2 | | | |
| D3+B3 | | | |
| D4+B4 | | | |

FIG. 2a

| Coatings | Comments | Thickness (μm) | Scratch resistance wear (N) | Scratch resistance penetration (N) | Scratch resistance Surface aspect |
|---|---|---|---|---|---|
| A+B | | 71.5 ± 8.2 | 5.89 | 8.83 |  |
| A1+B1 | | 49.5 ± 4 | 3.92 | 6.87 |  |
| A2+B2 | SERIE 1<br>Primer = Bindzil 30/360<br>Top-coat = Bindzil 40/170 | 48.9 ± 3.9 | 3.92 | 5.89 |  |
| A3+B3 | | 55.9 ± 4.4 | 2.94 | 5.89 |  |
| A4+B4 | | 73.7 ± 5.3 | 3.92 | 6.87 |  |

FIG. 2b

| Coatings | Comments | Thickness (μm) | Scratch resistance wear (N) | Scratch resistance penetration (N) | Scratch resistance Surface aspect |
|---|---|---|---|---|---|
| D+B | | 65.2 ± 4.5 | 5.89 | 7.85 |  |
| D1+B1 | | 66.3 ± 7.1 | 3.92 | 8.83 |  |
| D2+B2 | SERIE 3<br>Primer = Bindzil 40/170<br>Top-coat = Bindzil 40/170 | 66.1 ± 8.3 | 2.94 | 7.85 |  |
| D3+B3 | | 71.0 ± 5.7 | 5.89 | 8.83 |  |
| D4+B4 | | 67.7 ± 5.9 | 5.89 | 7.85 |  |

METHYLSILYL DERIVATISED SILICA PARTICLES, COLLOIDS, METHODS FOR MANUFACTURE AND KITS COMPRISING THE SAME

This application is a national stage filing under 35 U.S.C. § 371 of PCT/EP2016/054971, filed Mar. 9, 2016, which claims priority to European Patent Application No. 15158725.0, filed Mar. 12, 2015, the contents of which are each incorporated herein by reference in their entirety.

FIELD OF INVENTION

The present invention relates to silica particles. In particular to methylsilyl derivatised silica particles which have a methylsilyl content is in a range of between 1-6 µmol m$^{-2}$ on a surface of the silica particles. Furthermore the present invention relates to a colloidal silica comprising the methylsilyl derivatised silica particles. Furthermore the present invention relates to a method for the manufacture of the methylsilyl derivatised silica particles. Furthermore the present invention relates to a kit for a primer coating and a kit for a top-coat coating comprising the methylsilyl derivatised silica particles.

BACKGROUND OF INVENTION

Colloidal silica refers to a dispersion of silica particles in a liquid phase. In colloidal silica, silanol groups on a surface of silica particles tend to dissociate. This dissociation leads to a high negative charge. The high negative charge leads to inter silica particle siloxane bonding (self-condensation) leading to a gel of the colloidal silica. The colloidal silica is stabilised against inter silica particle siloxane bonding (self-condensation) by the presence of ionic charges on the silica particles, for example, by counter ions of a salt. If a pH of the colloidal silica is in the range of approximately 5-7 or if excess salt is added, then the silica particles in the colloid aggregate and form the gel. By their very nature of being electrostatically stabilised, colloidal silica has a limited shelf-life as it tends to form a gel over time. This is undesirable when the colloidal silica needs to be stored.

Coatings, such as non-stick coatings can be made from a sol-gel process. The sol-gel process can involve hydrolysis and a condensation of silica particles in the colloidal silica in a first mixture with an organoalkoxysilane in a second mixture. The two mixtures can be mixed and applied to a substrate, the resulting mixture is cured to form the coating on the substrate via the sol-gel process. Coatings manufactured this way are often referred to as ceramic coatings and are used for example to coat substrates (such as kitchen utensils) as an alternative to polytetrafluoroethylene (PTFE) coatings.

A paper titled "Coating of methyltriethoxysilane—Modified colloidal silica on polymer substrates for abrasion resistance" by Lee et al. is known from Journal of Sol-Gel Science and Technology 24, pp. 175-180, 2002. The document by Lee et al. discloses that a coating is prepared my providing colloidal silica (Ludox LS, 30 wt %) and mixing this with at least 10% methyltriethoxysilane (MTES, Si(OCH$_2$CH$_3$)$_3$CH$_3$) to form a coating solution. The coating solution is applied to a substrate and cured via the sol-gel process to form the coating on the substrate. The colloidal silica has a limited shelf-life as it tends to form a gel over time. Furthermore the coating solution has a limited shelf-life due to the limited shelf-life of the colloidal silica and a pH of the coating solution. The cured coating cannot be further used in a sol-gel process as the colloidal silica completely reacts with the methyltriethoxysilane to form the coating.

EP 2048116 discloses nano-dispersions. The nano-dispersions comprise nanoparticles, organic solvent, low amounts of water and substantially no dispersants. The nanoparticles can be particles of silica. The nanoparticles can comprise organic surface groups grafted from alkylyalkoxysilanes. The amount of grafting compounds added to the nanoparticles to obtain stable dispersions ranges between 2 and 40 wt %.

WO 2007/104258 discloses a non-stick coating. The non-stick coating is made from two main components of silicon dioxide. One component is colloidal silica comprising pure SiO$_2$ silica particles. The other component is an organoalkoxysilane. The two components are mixed to form a coating solution which is applied to a substrate. The coating solution is hydrolysed and condensed in a sol-gel process to form the non-stick coating on the substrate.

US 2010/0181322 and US 2013/014944 disclose a non-stick coating. The non-stick coating is prepared by making a first mixture of colloidal silica, an alcohol, a pigment and a food grade silicon oil. A second mixture comprises methyltrimethoxysilane (MTMS, Si(OCH$_3$)$_3$CH$_3$) and an acid. The two mixtures are then mixed together and the resulting mixture is applied to a substrate and cured to form the non-stick coating.

In all cases, due to the presence of salts and/or a pH the colloidal silica has a limited shelf-life as it often self-condenses and forms a gel.

In applications where filler and/or pigment particles need to be used this poses further problems. The filler and/or pigments particles contain additional salts in addition to the salts already present in the silica particles and the colloidal silica. In coating applications filler and/or pigment particles form slurries that have a pH which compromises a stability of the silica particles and the resulting colloidal silica. An excess of salt and/or the pH leads to the colloidal silica rapidly forming a gel. Therefore resulting dispersions have a reduced shelf-life. In applications where filler and/or pigment particles are needed, the known technologies are restrictive.

Furthermore when used in applications where organic pigment particles are needed in combinations with the silica particles and the resulting colloidal silica, the organic pigment particles often release significant amounts of salt when dispersed with water. These significant amounts of salt results in an accelerated gelling rate of the colloidal silica and therefore compromises a shelf-life of the product. This is more problematic with coloured organic pigments, which tend to release larger amounts of salt than inorganic pigments. There is therefore a need to provide a colloidal silica which, when used with pigment particles has an improved shelf-life.

Furthermore in applications where the first mixture needs to be mixed with a second mixture, this also means that a final mixture of the two mixtures has a reduced shelf-life in applications such as coatings as mixing of the two mixtures is not uniform due to gel formation.

There is a need to provide silica particles and a colloidal silica with improved stability which overcomes the aforementioned problems.

There is a need to provide silica particles and a colloidal silica with improved stability which can react via the sol-gel process with an organoalkoxysilane which may be used for coating applications.

There is a need to provide a method for the manufacture of silica particles and colloidal silica which is less susceptible to inter silica particle siloxane bonding (self-condensation) with improved shelf-life.

There is a need to provide a kit for coating applications which also overcomes the aforementioned problems. In particular a kit for coating applications which can be used with pigments which is less susceptible to inter silica particle siloxane bonding (self-condensation) with improved shelf-life.

SUMMARY OF INVENTION

In a first aspect the present invention relates to methylsilyl derivatised silica particles with a methylsilyl content in a range of between 1-6 µmol m$^{-2}$ on a surface of the silica particles.

In a further aspect the present invention relates to a colloidal silica. The colloidal silica comprises the methylsilyl derivatised silica particles, wherein a concentration of the methylsilyl derivatised silica particles is at least 20 wt %.

In a further aspect the present invention relates to a method for the manufacture of methylsilyl derivatised silica particles. The method comprising providing a colloidal silica. The colloidal silica is maintained at a temperature of between 50-90° C. To the colloidal silica a methyl alkoxysilane is added whilst maintaining the temperature at between 50-90° C. in an amount to provide a methylsilyl content in a range of between 1-6 µmol m$^{-2}$ on a surface of the silica particles.

In a further aspect the present invention relates to a kit for a primer coating. The kit comprising a two-pack system comprising as separate parts a first pack and second pack. The first pack comprises based on wt %:
  A colloidal silica (at least 30%) 25-35 wt % comprising methylsilyl derivatised silica particles with a methylsilyl content in a range of between 1-6 µmol m$^{-2}$ on a surface of the silica particles,
  Water 10-15 wt %,
  Alcohol 1-5 wt %,
  Silicon oil 0.1-2 wt %,
  Pigments 20-25 wt %, and
  The second pack comprises based on wt %:
  Methyl alkoxysilane 30-35 wt %,
  Acid 0.5-1 wt %.

In a further aspect the present invention relates to a kit for a top-coat coating. The kit comprising a two-pack system comprising as separate parts a first pack and second pack. The first pack comprises based on wt %:
  A colloidal silica (at least 40%) 25-30 wt % comprising methylsilyl derivatised silica particles with a methylsilyl content in a range of between 1-6 µmol m$^{-2}$ on a surface of the silica particles,
  Water 10-15 wt %,
  Alcohol 1-5 wt %,
  Co-solvent 5-15 wt %
  Silicon oil 0.1-2 wt %,
  Pigments 0.1-15 wt %, and
  The second pack comprises based on wt %:
  Methyl alkoxysilane 35-45 wt %,
  Acid 1-2 wt %.

DETAILED DESCRIPTION

For a complete understanding of the present invention and the advantages thereof, reference is made to the following detailed description.

It should be appreciated that the various aspects and embodiments of the detailed description as disclosed herein are illustrative of the specific ways to make and use the invention and do not limit the scope of invention when taken into consideration with the claims and the detailed description. It will also be appreciated that features from different aspects and embodiments of the invention may be combined with features from different aspects and embodiments of the invention.

In a first aspect the present invention relates to methylsilyl derivatised silica particles with a methylsilyl content in a range of between 1-6 µmol m$^{-2}$ on a surface of the silica particles.

The methylsilyl derivatised silica particles may have a methylsilyl content within the range 1-6 µmol m$^{-2}$, such as 2-5 µmol m$^{-2}$, 2-4 µmol m$^{-2}$, 3-4 µmol m$^{-2}$ and 3-5 µmol m$^{-2}$. The methylsilyl content can be more specifically 1, 2, 3, 4, 5 and 6 µmol m$^{-2}$. It is to be appreciated that the range is not limited to specific integers and the range can also be 1.5-5.5 µmol m$^{-2}$, 2.5-4.5 µmol m$^{-2}$, 3.5-3.75 µmol m$^{-2}$, hence within the range 1-6 µmol m$^{-2}$.

The methylsilyl derivatised silica particles are analysed to show the siloxane bonds between the Si atoms at the surface of the silica particles and the Si atoms of the methyl alkoxysilane i.e. methylsilyl moieties by solid state cross polarisation/magnetic angle spinning, CP/MAS and $^{29}$Si-NMR.

The silica particles include commercially available silica particles. The silica particles can be selected from one of Klebosol sold by Clariant, Ludox sold by WR Grace, Bindzil 30/360 and Bindzil 40/170 sold by AkzoNobel, Nalco AG sold by Nalco and Snowtex sold by Nissan Chemicals.

In a further aspect the present invention relates to a colloidal silica. The colloidal silica comprises the methylsilyl derivatised silica particles, wherein a concentration of the methylsilyl derivatised silica particles is at least 20 wt %. The concentration of the methylsilyl derivatised silica particles may be at least 30 wt %. The concentration of the methylsilyl derivatised silica particles may be at least 40 wt %. It is preferable that the concentration of the methylsilyl derivatised silica particles does not exceed 50 wt %. therefore it is preferable that the concentration of the methylsilyl derivatised silica particles is between 20-50 wt %.

The colloidal silica comprising the methylsilyl derivatised silica particles according to the present invention has enhanced stability towards salt than a colloidal silica comprising silica particles that are not methylsilyl derivatised. The colloidal silica with the methylsilyl derivatised silica particles according to the present invention is still reactive and not inert. Upon drying and curing, it does not undergo self-condensation and can further react with a methyl alkoxysilane to form a coating on a substrate. The colloidal silica with the methylsilyl derivatised silica particles according to the present invention is less susceptible, if at all to inter silica particle siloxane bonding (self-condensation) leading to a gel. The colloidal silica with the methylsilyl derivatised silica particles according to the present invention has an improved shelf-life compared to a colloidal silica comprising silica particles that are not methylsilyl derivatised. It was observed the viscosity of the colloidal silica with the methylsilyl derivatised silica particles according does not significantly increase over a period of 12 months.

Colloidal silica means a dispersion of the methylsilyl derivatised silica particles in a liquid phase. The liquid phase means a fluid phase at room temperature and pressure. The liquid phase can be an aqueous liquid phase or an organic liquid phase. The aqueous liquid phase means that the phase contains water. The water is preferably distilled and/or demineralised water. The aqueous liquid phase may also include a liquid that is miscible with water such an alcohol. The liquid phase may be sodium stabilised in that it comprises water, sodium ions (0.2-0.4 wt %) and hydroxyl ions (0.1 mM).

The liquid phase may also include stabilising cations. The stabilising cations are present in amount of preferably 1 wt % and less. The stabilising cations include $K^+$, $Na^+$, $Li^+$, $NH_4^+$ or any combination thereof.

The colloidal silica may have a high relative standard deviation of a particle size distribution (i.e. methylsilyl derivatised silica particles) in the colloidal silica. It has been found that having a high relative standard deviation achieves an increased packing of the colloidal silica and an enhanced and a more uniform film-forming capability when used in coatings. The relative standard deviation of the particle size distribution is a ratio of the standard deviation of the particle size distribution to the mean particle size. The relative standard deviation of the particle size distribution in the colloidal silica is preferably higher than 20%, more preferably higher than 30%, and even more preferably higher than about 40%.

In the colloidal silica, the methylsilyl derivatised silica particles may have a specific surface area (SA) of between 20-900 $m^2g^{-1}$, preferably between 80-500 $m^2g^{-1}$ and more preferably between 150-400 $m^2g^{-1}$. The specific surface area is measured by "Sears Titration" as disclosed in Anal. Chem., 1956, 28 (12), pp 1981-1983.

In the colloidal silica, the methylsilyl derivatised silica particles may have an average particle diameter of between 3-150 nm, preferably between 5-30 nm, and more preferably between 7-22 nm. The average particle diameter is measured according to the formula; average particle diameter=2730/SA, wherein SA is the specific surface area as mentioned above.

It is to be noted that an average particle diameter and the specific surface area of the methylsilyl derivatised silica particles in the colloidal silica is not affected by surface modification of the silica particles.

The colloidal silica comprising the methylsilyl derivatised silica particles preferably has an S-value between 20-100, more preferably between 30-95, more preferably between 50-90 and most preferably between 60-85. It has been found having an S-value within these more preferable ranges improves a stability of the colloidal silica comprising the methylsilyl derivatised silica particles. The S-value characterises an extent of aggregation of colloidal silica particles, i.e. the degree of aggregation and/or microgel formation. The S-value is measured according to Iler, R. K. & Dalton, R. L; J. Phys. Chem. 60 (1956), pp. 955-957.

In a further aspect the present invention relates to a method for the manufacture of methylsilyl derivatised silica particles. The method comprising providing a colloidal silica. The colloidal silica is maintained at a temperature of between 50-90° C. To the colloidal silica a methyl alkoxysilane is added whilst maintaining the temperature at between 50-90° C. in an amount to provide a methylsilyl content in a range of between 1-6 µmol $m^{-2}$ on a surface of the silica particles.

It is to be appreciated that the methylsilyl derivatised silica particles with a methylsilyl content is in a range of between 1-6 µmol $m^{-2}$ on a surface of the silica particles is in the form of a colloid based on the provision of the colloidal silica.

The method allows the manufacture of silica particles with a methylsilyl content in a range of between 1-6 µmol $m^{-2}$ on a surface of the silica particles and the colloid thereof which does not undergo inter silica particle siloxane bonding (self-condensation) forming a gel. It was observed that where the methylsily content was above the range 1-6 µmol $m^{-2}$, the resultant colloidal silica formed a gel.

The methylsilyl derivatised silica particles are suitably formed by a surface modification of silica particles with a methyl alkoxysilane. That is to say that silica particles are suitably derivatised with methylsilyl groups on their surface by reaction with the methyl alkoxysilane. The methylsilyl derivatised silica particles therefore suitably have siloxane bonds which are suitably formed between the Si atoms at the surface of the silica particles and the Si atoms of the methyl alkoxysilane i.e. methylsilyl moieties.

In the method for the manufacture of methylsilyl derivatised silica particles, the colloidal silica means a dispersion of the silica particles in a liquid phase as previously mentioned. The aqueous liquid phase may also comprise organic solvents. The organic solvents include lower alcohols (such as ethanol, methanol, isopropanol), acetone or mixtures thereof. The organic solvents improve phase contact of silica particles in the colloidal silica with the methyl alkoxysilane and therefore improves a rate of manufacture of the methylsilyl derivatised silica particles. The organic solvents are present in an amount of between 1-20 wt % of the aqueous liquid phase, more preferably an amount of between 1-10 wt %, and even more preferably an amount of between 1-5 wt %. When the organic solvents are present in an amount of between 1-5 wt % of the aqueous liquid phase, this diminishes the amounts of volatile organic components in the method whilst maintaining phase contact of silica particles in the colloidal silica with the methyl alkoxysilane.

In the method for the manufacture of methylsilyl derivatised silica particles, the silica particles are preferably present in the colloidal silica in an amount of between 15-80 wt %, preferably between 25-65 wt %, and more preferably between 30-55 wt %. The higher the silica particles content, then the more concentrated the resulting colloid of the methylsilyl derivatised silica particles is.

Where the silica particles content in the colloidal silica is outside of the above ranges, then there is a too high solid content of silica particles which poses a problem with stability and/or the uniform manufacture of the silica particles with the methylsilyl content in the range of between 1-6 µmol $m^{-2}$ on the surface of the silica particles.

In the method for the manufacture of methylsilyl derivatised silica particles, the silica particles present in the colloidal silica include commercially available silica particles. The silica particles can be selected from one of Klebosol sold by Clariant, Ludox sold by WR Grace, Bindzil 30/360 and Bindzil 40/170 sold by AkzoNobel, Nalco AG sold by Nalco and Snowtex sold by Nissan Chemicals.

In the method for the manufacture of methylsilyl derivatised silica particles, a pH of the colloidal silica is from 1-13, preferably from 6-12, and more preferably from about 7.5-11. A desired pH is achieved by adding an acid or base to the colloidal silica as known in the art.

The temperature is maintained for example by means of a conventional hot plate stirrer used in a laboratory. The temperature of the colloidal silica may be maintained at between 60-80° C. The temperature of the colloidal silica may be maintained at 70° C.

The methyl alkoxysilane added to the colloidal silica is selected from one of methyltriethoxysilane, methyltrimethoxysilane or dimethyldiethoxysilane. It is preferable that the methyl alkoxysilane is added neat (not dissloved) as a neat methyl alkoxysilane ensures a more rapid formation of the methylsilyl derivatised silica particles.

Methyltriethoxysilane (CAS No. 2031-67-6) also known as MTES refers to $CH_3Si(OCH_2CH_3)_3$. Methyltrimethoxysilane (CAS No. 1185-55-3) also known as MTMS refers to $CH_3Si(OCH_3)_3$. Dimethyldiethoxysilane (CAS No. 78-62-6) also known as DMDES refers to $(CH_3)_2Si(OCH_2CH_3)_2$.

It is preferable that the methyl alkoxysilane added to the colloidal silica is methyltriethoxysilane. Methyltriethoxysilane does not produce methanol, which is toxic.

To the colloidal silica the methyl alkoxysilane is added preferably with agitation of the colloidal silica. The agitation can be provided by the hot plate stirrer which also maintains the temperature. Preferably the agitation is constant throughout the method. During this step the temperature may be maintained at between 60-80° C., the temperature may be maintained at 70° C.

The methyl alkoxysilane is preferably added to the colloidal silica using a syringe pump known in the art, so as to ensure a steady and controlled addition. The methyl alkoxysilane may be added via a septum and needle to avoid evaporation and prevent any unwanted side reactions.

The methyl alkoxysilane may be added at a dosing rate of between 0.2-2 μmol methyl alkoxysilane/(m²·h). The methyl alkoxysilane may be added at a dosing rate of between 0.5-2 μmol methyl alkoxysilane/(m²·h). The dosing rate can be calculated by common general knowledge based on the specific surface area (as mentioned previously) and the molar quantities of the methyl alkoxysilane. When the methyl alkoxysilane is added at a dosing rate of between 0.5-2 μmol methyl alkoxysilane/(m²·h) the formation of the methylsilyl derivatised silica particles proceeds faster than when the dosing rate is of between 0.2-2 μmol methyl alkoxysilane/(m²·h). It has been found that where methyl alkoxysilane is added at a dosing rate of between 0.5-2 μmol methyl alkoxysilane/(m²·h) the resultant colloidal silica remained opaque and does not form a sol-gel.

It is preferable that the methyl alkoxysilane is added over a period of more than 2 minutes. It was observed that where the methyl alkoxysilane is added within 2 minutes the mixture formed a sol-gel almost immediately.

In all cases a colloid of the methylsilyl derivatised silica particles can be collected with filtration. Filtration can be performed with a filter of 5 microns; however filters of 2 or 1 micron may also be used.

In a further aspect the present invention relates to a kit for a primer coating. The kit comprising a two-pack system comprising as separate parts a first pack and second pack. The first pack comprises based on wt %:
A colloidal silica (at least 30%) 25-35 wt % comprising methylsilyl derivatised silica particles with a methylsilyl content in a range of between 1-6 μmol m$^{-2}$ on a surface of the silica particles,
Water 10-15 wt %,
Alcohol 1-5 wt %,
Silicon oil 0.1-2 wt %,
Pigments 20-25 wt %, and The second pack comprises based on wt %:
Methyl alkoxysilane 30-35 wt %,
Acid 0.5-1 wt %.

In a further aspect the present invention relates to a kit for a top-coat coating. The kit comprising a two-pack system comprising as separate parts a first pack and second pack. The first pack comprises based on wt %:
A colloidal silica (at least 40%) 25-30 wt % comprising methylsilyl derivatised silica particles with a methylsilyl content in a range of between 1-6 μmol m$^{-2}$ on a surface of the silica particles,
Water 10-15 wt %,
Alcohol 1-5 wt %,
Co-solvent 5-15 wt %
Silicon oil 0.1-2 wt %,
Pigments 0.1-15 wt %, and The second pack comprises based on wt %:
Methyl alkoxysilane 35-45 wt %,
Acid 1-2 wt %.

The kits for the first pack in the kit for the primer coating and the kit for the top-coat coating displays an increased shelf-life compared to non-methylsilyl derivatised silica particles especially when used in applications where salt is prevalent from the pigments such as in high temperature resistant coating applications. It was found that a relative increase in viscosity over a period of 6 months is less than 10% for the kits for the first pack according to the present invention.

Single layer coatings when applied to a substrate according to either the kit for the first pack or the kit for a top-coat coating, when mixed and cured via the sol-gel process are stable and resilient to temperatures of between 350-400° C.

By the kit for the primer coating it is meant that the kit for the primer coating is to be applied directly to a substrate.

By the kit for the top-coat coating it is meant that the kit for the top-coat coating is to be applied to the primer coating.

It is to be appreciated that the kit for the primer coating can be used to provide a single layer coating to the substrate. It is to be appreciated that the kit for the top-coat coating can be used to provide a single layer coating to the substrate. Alternatively the kit for the primer coating can be used to provide a single layer coating to the substrate onto which the kit for the top-coat coating is applied to form a double layer coating system—as demonstrated in the examples below.

In the kit for the primer coating and the kit for a top-coat coating it is to be appreciated that the components for first pack(s) may be separate or pre-mixed. In the kit for the primer coating and the kit for a top-coat coating it is to be appreciated that the components for the second pack(s) may be separate or pre-mixed. In each case the components of the first pack(s) are mixed with components for the second pack(s) when the respective coating is to be made.

Double layer coatings manufactured with the kit for the primer coating and the kit for a top-coat coating exhibit enhanced physical properties when applied and cured on a substrate, such as increased pencil harness (coating hardness), improved adherence to the substrate, increased resistance to scratching (i.e. penetration), wear resistance and non-stick properties. The results of different properties indicate the benefits of using the kit compositions according to the present invention compared to kit compositions that utilise non-methylsilyl derivatised silica particles in double layer coatings.

The kit compositions according to the present invention are not limited to a specific substrate to which they are applied. The substrate used is based on the final application. The substrate includes metallic and non-metallic components which can be for buildings, such as facade panels made of steel, stainless steel, aluminium and aluminium alloys and brickwork. Other substrates may be locomotion and transport and parts thereof. Other substrates may be equipment and apparatus and machines for commercial, industrial and research purposes. Other supports are household articles and equipment such as electrical appliances, cooking utensils, cookware, containers, ceramics, cutlery and devices and aids for games, sport and leisure. Other substrates include applications where high temp resistance is required.

It is to be noted that the kit for the primer coating is typically more pigmented to provide a more pigmented coating, while the kit for the top-coat coating is less pigmented and therefore is clear or transparent.

The colloidal silica includes the types of colloidal silica as previously mentioned which comprise the methylsilyl derivatised silica particles.

The water can be demineralised water or non-demineralised water.

The alcohol can be selected from one of iso-propanol, methanol, ethanol or propanol or any combination thereof.

The acid can be selected from one of acetic acid, formic acid, phosphoric acid, hydrochloric acid, nitric acid, sulphuric acid and propionic acid. The hydrolysis and condensation of the hydrolysable starting compounds from the first pack and second pack occurs by the sol-gel process. In the sol-gel process, the hydrolysable compounds are hydrolysed with water, in the presence of the acid which acts as a catalyst. The acidic hydrolysis and condensation is preferably carried out at a pH of between 1-3, which is achieved with the acid. The preparation of the coating composition for the top-coat coating is also carried out by acidic catalysis.

Further details of the sol-gel process are described, for example in Sol-Gel Science—The Physics and Chemistry of Sol-Gel-Processing, Academic Press, (1990), C. J. Brinker, G. W. Scherer.

The silicon oil is preferably present in an amount of between 0.5-1 wt %, and more preferably 0.75-1 wt %, when used in these ranges the silicon oil improves a texture (a more smoother) and/or non-stick property and/or improves the durability of the coating. The silicon oil may be a mixture of silicon oils. The silicon oil may be a phenyl silicon, methyl-phenyl silicon and methyl silicon. The silicon oil may be a food grade silicon oil and in particular, one selected from food grade methyl-phenyl silicon and methyl silicon. The methyl-phenyl silicon oils, for non-food oils can be from WACKER under trade name WACKER SILICONOL AP150 and from DOW CORNING under trade name DOW CORNING 550 fluid. The methyl-phenyl silicon oils, for food oils can be from WACKER ARM. As methyl silicon oils, oil from RHODIA under trade name RHODIA 47 V350, oil WACKER 200 fluid from WACKER or TEGO ZV 9207 oil from TEGO, may be used, which are food-grade methylsilicon oils. The silicon oil may be Bluesil FLD 47.

The co-solvent is used to aid penetration and/or solvation of the pigment in the respective first pack when the components are mixed. The co-solvent is preferably butylglycol.

The pigments can be organic or inorganic pigments or any mixture thereof to achieve a desired colour and or texture of the coating layer. Organic pigments offer the advantage providing an array of different colours with different intensifies. Organic pigments are preferred in applications that utilise lower temperatures (e.g. paints) since organic pigments tend to decompose at elevated temperatures. Inorganic pigments are preferred in applications that utilise higher temperatures (e.g. heat and fireproof applications) since inorganic pigments are stable at higher temperatures and are inert at such temperatures. Therefore depending on the end application, the organic and inorganic pigments can be chosen accordingly. The pigments can be selected from one of titanium dioxide, copper-chromium-manganese mixed oxides, iron oxide, carbon black, pyralene red, aluminosilicates, metal flakes and particularly aluminium flakes.

The present invention is demonstrated by the following non-limiting examples.

EXAMPLES

1. Manufacture of Methylsilyl Derivatised Silica Particles and Colloidal Silica Thereof Silica particles in the form of Bindzil 30/360 or Bindzil 40/170 were chosen as starting materials.

A colloidal silica of Bindzil 30/360 30 wt % in water, pH of about 10 with a colloidal silica particle size of 7 nm based on a specific surface area of 360 $m^2g^{-1}$ was prepared. A colloidal silica of Bindzil 40/170 40 wt % in water, pH of about 9-10 with a colloidal silica particle size of 7 nm based on a specific surface area of 170 $m^2g^{-1}$ was prepared.

The respective colloidal silica was placed in a 3-neck round bottom flask on a magnetic stirrer and a temperature of 70° C. was maintained.

A methyl alkoxysilane was dosed via a syringe pump to the colloidal silica at a constant temperature of 70° C. with constant agitation. The methyl alkoxysilane was added via a septum and needle to the 3-neck round bottom flask. The 3-neck round bottom flask remained sealed.

In a first experiment the methyl alkoxysilane was added at a dosing rate of 2 µmol methyl alkoxysilane/($m^2 \cdot h$). In a second experiment the methyl alkoxysilane was added at a dosing rate 0.5 µmol methyl alkoxysilane/($m^2 \cdot h$).

The methyl alkoxysilane was added at a dosing rate of more than 2 minutes.

In the first experiment the methylsilyl derivatised silica particles has a methylsilyl content of 1 µmol $m^{-2}$ on a surface of the silica particles.

In the second experiment the methylsilyl derivatised silica particles has a methylsilyl content of 4 µmol $m^{-2}$ on a surface of the silica particles.

From the first and second experiment the colloid of the methylsilyl derivatised silica particles were collected after filtration from a filtrate. Filtration was performed with a filter of 5 microns.

Samples of the colloid of the methylsilyl derivatised silica particles sample were frozen with liquid nitrogen and put in a freeze-dryer overnight. The sample was analysed by solid state $^1H$ and CP/MAS $^{29}Si$ NMR spectroscopy. The $^1H$ NMR spectrum showed the presence of silane species in the sample and the $^{29}Si$ NMR spectrum showed covalent attachment of the silane modification to the silica particle surface.

The NMR measurements were performed on a 14.1 T Varian Inova fitted with a 3.2 mm double resonance probe tuned to $^1H$ (600 MHz) and $^{29}Si$ (119 MHz). The experiments were conducted at 298 K and the rotor was spun at the magic angle with 15 kHz.

The $^1H$ spectrum was recorded using a 90° pulse and a repetition delay of 20 s. The $\{^1H\}^{29}Si$ CP spectrum was recorded using a contact time of 10 ms and repetition delay of 3 s.

The CP/MAS $^{29}$Si NMR spectra showed that the methylsilyl is covalently attached to the surface of the silica particles, and the $^1$H spectrum verified the presence of the methylsilyl groups.

2. Salt Stability Test

A stability analysis of colloidal silica comprising the methylsilyl derivatised silica particles according to the present invention in a NaCl solution (12 wt %) was made. The study assessed the gel time of various colloidal silica with different NaCl concentrations.

The stability analysis was with 5 parts of colloidal silica comprising the methylsilyl derivatised silica and 1 part of NaCl solution of different concentrations. The colloidal silica comprising the methylsilyl derivatised silica was put in a beaker with a magnetic stirrer which was agitated at a constant rate in all experiments. A clock was started when 1 part of NaCl solution had been added and was stopped when the colloidal silica comprising the methylsilyl derivatised silica turned into a gel. Gel formation was deemed to occur when the magnetic stirrer no longer stirred. Table 1 shows the results of gel time in minutes of various colloidal silica comprising different degrees of methylsilyl derivatised silica against varying NaCl concentrations.

TABLE 1

| NaCl conc. (weight-%) | Methylsilyl content on surface of the silica particles in the colloidal silica 20 wt % | | | | |
|---|---|---|---|---|---|
| in sol | 1 μmol/m$^2$ | 2 μmol/m$^2$ | 3 μmol/m$^2$ | 4 μmol/m$^2$ | 0 μmol/m$^2$ |
| 1.67 | 150 min | >450 min | >480 min | 90 min | |
| 2 | 60 min | 270 min | 360 min | 50 min | 8 min |
| 8.33 | 1.7 min | 2.8 min | 1.7 min | 1.3 min | |

The results confirm that where the colloidal silica according to the present invention has a methylsilyl content in a range of between 2-3 μmol m$^{-2}$ on a surface of the silica particles, it is slightly more stable to NaCl (i.e. gelling) than where the methylsily content is of 1 and 4 μmol/m$^2$ respectively. The colloidal silica according to the present invention with methylsilyl derivatised silica particles is significantly more stable in NaCl solution, 360 min gel time for 2 μmol methylsilyl/m$^2$ compared with 8 min gel time in comparison to colloidal silica that is not methylsilyl derivatised.

The results demonstrate that colloidal silica with the methylsilyl derivatised silica particles according to the present invention is 45 times more stable towards salt than colloidal silica that are not methylsilyl derivatised having the same specific surface area and silica concentration.

The colloidal silica with the methylsilyl derivatised silica particles according to the present invention is more stable in salt solution and is therefore stable in mixtures containing pigment and filler particles—see example 4.

The colloidal silica with methylsilyl derivatised silica particles wherein a concentration of the methylsilyl derivatised silica particles is at least 20 wt % were found to be stable directly after being derivatised with the methylsilyl. It was observed that its viscosity does not significantly increase over a period of 12 months as shown in table 2. The viscosity was measured with a Brookfield rotational viscometer.

TABLE 2

| Surface modification with methylsilyl (μmol/m$^2$) | Initial Viscosity (cP) | Viscosity (cP) after 12 months |
|---|---|---|
| 1.00 | 5.8 | 5.7 |
| 2.00 | 6.0 | 5.5 |
| 3.00 | 6.4 | 6.1 |
| 4.00 | 6.1 | 6 |

It was observed that a viscosity does not significantly increase over a period of 12 months when a concentration of the methylsilyl derivatised silica particles is at least 30 wt % or at least 40 wt % in the respective colloid.

3. Sol-Gel Forming Properties of Colloidal Silica Derivative

In order to determine if the colloidal silica with the methylsilyl derivatised silica particles according to the present invention could be used for coating applications i.e. further react in a sol-gel processes with an organoalkoxysilane to form coatings, film forming properties were analysed to make sure no significant sol-gel reaction (i.e. self-condensation) occurred when coated to a substrate.

A film applicator was used to prepare films of colloidal silica with the methylsilyl derivatised silica particles. Wet films (200 μm) of colloidal silica (20 wt %, 30 wt % and 40 wt %) with the methylsilyl derivatised silica particles were applied to a glass substrate in three experiments. In each case the glass substrate had a size of 3×100×200 mm. The respective glass substrate was then cured for 10 mins at 160° C. After drying and cooling it was found that a resulting powdery film had formed. The powdery film was easily wiped off the glass substrate by finger. These results indicate that no sol-gel reaction (i.e. self-condensation) occurs and the methylsilyl derivatised silica particles (and colloids thereof) can further react in a sol-gel processes with an organoalkoxysilane to form coatings via the sol-gel process.

4. Stability in Pigmented Applications

As noted in the background section, coatings manufactured via the sol-gel method using colloidal silica often need different colours (pigments).

However the pigments used release significant amounts of salt when dispersed in aqueous media. The release of salts in the aqueous media in the presence of colloidal silica induces an accelerated gelling of the slurry and therefore comprises shelf-life.

As a control experiment a mixture for the manufacture of high temperature resistant coatings was made with colloidal silica Bindzil 9950 by the addition of organic and/inorganic pigments according to following:

Colloidal silica of Bindzil 9950 (40%) 25-35 wt %
Demineralised water 10-15 wt %,
Alcohol 1-5 wt %,
Silicon oil 0.1-2 wt %; and
Pigments 20-25 wt %.

The mixture only lasted for 2-3 weeks in an accelerated (at elevated temperature) sol-gel test to determine a shelf-life of the slurry.

The control experiment was repeated, but the Bindzil 9950 was replaced with samples of the methylsilyl derivatised silica particles (Bindzil 40/170) according to the invention with a methylsilyl content of 1, 2, 3, 4, 5 and 6 μmol m$^{-2}$ on a surface of the silica particles. These mixtures had a shelf-life exceeding 7 weeks. When used in the manufacture of a high temperature resistant coating (by reacting with methyl alkoxysilane and acid), the coating had a matt appearance.

The control experiment was repeated, but the Bindzil 9950 was replaced with samples of the methylsilyl derivatised silica particles (Bindzil 30/360) according to the invention with a methylsilyl content of 1, 2, 3, 4, 5 and 6 μmol m$^{-2}$ on a surface of the silica particles. These mixtures had a shelf-life exceeding 7 weeks. When used in the manufacture of a high temperature resistant coating (by reacting with methyl alkoxysilane and acid), the coating had a glossy appearance.

5. Double Layer Coatings and Properties Thereof

Methylsilyl derivatised silica particles of Bindzil 30/360 (exp270/5-8) and Bindzil 40/170 (exp270/1-4) according to the present invention were used in kit compositions according to the present invention for the manufacture of double layer coatings. Non-methylsilyl derivatised silica particles of Bindzil 30/360 and Bindzil 40/170 were used as a control. See Table 3.

TABLE 3

| Colloidal silica | modification (μmol/m$^2$) | Methyl triethoxy (g/kg) | Content SiO$_2$ (%) | Content MTES (%) |
|---|---|---|---|---|
| Bindzil 30/360 | 0 | 0 | 30.00% | 0.00% |
| exp270/5 | 1 | 19.3 | 29.43% | 1.89% |
| exp270/6 | 2 | 38.5 | 28.89% | 3.71% |
| exp270/7 | 3 | 57.8 | 28.36% | 5.46% |
| exp270/8 | 4 | 77 | 27.86% | 7.15% |
| Bindzil 40/170 | 0 | 0 | 40.00% | 0.00% |
| exp270/1 | 1 | 12.1 | 39.52% | 1.20% |
| exp270/2 | 2 | 24.2 | 39.05% | 2.36% |
| exp270/3 | 3 | 36.4 | 38.60% | 3.51% |
| exp270/4 | 4 | 48.5 | 38.15% | 4.63% |

Kit compositions for the double layer coating (layer 1 and layer 2) are listed in table 4 and are based on the silica particles as shown in table 3. It is to be appreciated that part A refers to a first pack and part B refers to a second pack.

TABLE 4

| | Components | Weight (g) |
|---|---|---|
| Layer 1 - Coloured sol-gel - 'PRIMER' | | |
| Part A | Colloidal silica (30%) | 29 |
| | Water | 10 |
| | Isopropanol | 4.5 |
| | Bluesil FLD 47V50 | 1 |
| | Bayferrox Schwarz 303T | 20 |
| Part B | MTES | 35 |
| | Formic acid | 0.5 |
| | Total | 100 |
| Layer 2 - Clear/transparent sol-gel - 'TOP-COAT' | | |
| Part A | Colloidal silica (40%) | 30 |
| | Water | 10 |
| | Isopropanol | 5 |
| | Butylglycol | 10 |
| | Bluesil FLD 47V50 | 1 |
| | Colorona Blackstar Green | 2 |
| Part B | MTES | 40 |
| | Acetic acid | 2 |
| | Total | 100 |

To compare non-methylsilyl derivatised silica particles with methylsilyl derivatised silica particles, each test series contained a reference, in which non-methylsilyl derivatised silica particles was used. In the reference formulations, the amount of methyl alkoxysilane (MTES) in part B was increased somewhat to compensate for the methyl alkoxysilane (MTES) added in the methylsilyl derivatised silica particles.

In the final mixtures (Part A+B), the total amount of methyl alkoxysilane (MTES) is kept constant (see tables 5-7), in each formulation.

Different series (Series 1, 2 and 3) of various double layer coatings for kit compositions for the manufacture of double layer coatings were prepared according to tables 5-7.

TABLE 5

SERIE 1
Primer based on Bindzil 30/360
Top-coat based Bindzil 40/170

| | | Primer/REF 30 | |
|---|---|---|---|
| A | | Components | Weight (g) |
| | Part A | Colloidal silica Bindzil 30/360 | 29 |
| | | Water | 10 |
| | | Isopropanol | 4.5 |
| | | Bluesil FLD 47V50 | 1 |
| | | Bayferrox Schwarz 303 T | 20 |
| | Part B | MTES | 35 |
| | | Formic acid | 0.5 |
| | | Total | 100 |

| | | Top-coat/REF 40 | |
|---|---|---|---|
| B | | Components | Weight (g) |
| | Part A | Colloidal silica Bindzil 40/170 | 30 |
| | | Water | 10 |
| | | Isopropanol | 5 |
| | | Butylglycol | 10 |
| | | Bluesil FLD 47V50 | 1 |
| | | Colorona Blackstar Green | 2 |
| | Part B | MTES | 40 |
| | | Acetic acid | 2 |
| | | Total | 100 |

| | | Primer/exp270_5 | |
|---|---|---|---|
| A1 | | Components | Weight (g) |
| | Part A | Bindzil exp270/5 | 29.56 |
| | | Water | 10 |
| | | Isopropanol | 4.5 |
| | | Bluesil FLD 47V50 | 1 |
| | | Bayferrox Schwarz 303 T | 20 |
| | Part B | MTES | 34.44 |
| | | Formic acid | 0.5 |
| | | Total | 100 |

| | | Top-coat/exp270_1 | |
|---|---|---|---|
| B1 | | Components | Weight (g) |
| | Part A | Bindzil exp270/1 | 30.36 |
| | | Water | 10 |
| | | Isopropanol | 5 |
| | | Butylglycol | 10 |
| | | Bluesil FLD 47V50 | 1 |
| | | Colorona Blackstar Green | 2 |
| | Part B | MTES | 39.64 |
| | | Acetic acid | 2 |
| | | Total | 100 |

TABLE 5-continued

SERIE 1
Primer based on Bindzil 30/360
Top-coat based Bindzil 40/170

Primer/exp270_6

| A2 | Components | Weight (g) |
|---|---|---|
| Part A | Bindzil exp270/6 | 30.11 |
|  | Water | 10 |
|  | Isopropanol | 4.5 |
|  | Bluesil FLD 47V50 | 1 |
|  | Bayferrox Schwarz 303 T | 20 |
| Part B | MTES | 33.89 |
|  | Formic acid | 0.5 |
|  | Total | 100 |

Top-coat/exp270_2

| B2 | Components | Weight (g) |
|---|---|---|
| Part A | Bindzil exp270/2 | 30.72 |
|  | Water | 10 |
|  | Isopropanol | 5 |
|  | Butylglycol | 10 |
|  | Bluesil FLD 47V50 | 1 |
|  | Colorona Blackstar Green | 2 |
| Part B | MTES | 39.28 |
|  | Acetic acid | 2 |
|  | Total | 100 |

Primer/exp270_7

| A3 | Components | Weight (g) |
|---|---|---|
| Part A | Bindzil exp270/7 | 30.68 |
|  | Water | 10 |
|  | Isopropanol | 4.5 |
|  | Bluesil FLD 47V50 | 1 |
|  | Bayferrox Schwarz 303 T | 20 |
| Part B | MTES | 33.32 |
|  | Formic acid | 0.5 |
|  | Total | 100 |

Top-coat/exp270_3

| B3 | Components | Weight (g) |
|---|---|---|
| Part A | Bindzil exp270/3 | 31.08 |
|  | Water | 10 |
|  | Isopropanol | 5 |
|  | Butylglycol | 10 |
|  | Bluesil FLD 47V50 | 1 |
|  | Colorona Blackstar Green | 2 |
| Part B | MTES | 38.92 |
|  | Acetic acid | 2 |
|  | Total | 100 |

Primer/exp270_8

| A4 | Components | Weight (g) |
|---|---|---|
| Part A | Bindzil exp270/8 | 31.22 |
|  | Water | 10 |
|  | Isopropanol | 4.5 |
|  | Bluesil FLD 47V50 | 1 |
|  | Bayferrox Schwarz 303 T | 20 |
| Part B | MTES | 32.78 |
|  | Formic acid | 0.5 |
|  | Total | 100 |

Top-coat/exp270_4

| B4 | Components | Weight (g) |
|---|---|---|
| Part A | Bindzil exp270/4 | 31.45 |
|  | Water | 10 |
|  | Isopropanol | 5 |
|  | Butylglycol | 10 |
|  | Bluesil FLD 47V50 | 1 |
|  | Colorona Blackstar Green | 2 |
| Part B | MTES | 38.55 |
|  | Acetic acid | 2 |
|  | Total | 100 |

TABLE 6

SERIE 2
Primer based on Bindzil 30/360
Top-coat based Bindzil 30/360

Primer/REF B30

| A | Components | Weight (g) |
|---|---|---|
| Part A | Colloidal silica Bindzil 30/360 | 29 |
|  | Water | 10 |
|  | Isopropanol | 4.5 |
|  | Bluesil FLD 47V50 | 1 |
|  | Bayferrox Schwarz 303 T | 20 |
| Part B | MTES | 35 |
|  | Formic acid | 0.5 |
|  | Total | 100 |

Top-coat/REF B30

| C | Components | Weight (g) |
|---|---|---|
| Part A | Colloidal silica Bindzil 30/360 | 40 |
|  | Water | 0 |
|  | Isopropanol | 5 |
|  | Butylglycol | 10 |
|  | Bluesil FLD 47V50 | 1 |
|  | Colorona Blackstar Green | 2 |
| Part B | MTES | 40 |
|  | Acetic acid | 2 |
|  | Total | 100 |

Primer/exp270_5

| A1 | Components | Weight (g) |
|---|---|---|
| Part A | Bindzil exp270/5 | 29. |
|  | Water | 10 |
|  | Isopropanol | 4.5 |
|  | Bluesil FLD 47V50 | 1 |
|  | Bayferrox Schwarz 303 T | 20 |
| Part B | MTES | 34.44 |
|  | Formic acid | 0.5 |
|  | Total | 100 |

Top-coat/exp270_5

| C1 | Components | Weight (g) |
|---|---|---|
| Part A | Bindzil exp270/5 | 40. |
|  | Water | 0 |
|  | Isopropanol | 5 |

TABLE 6-continued

SERIE 2
Primer based on Bindzil 30/360
Top-coat based Bindzil 30/360

|  |  |  |  |
|---|---|---|---|
| Part B | Butylglycol | 10 |  |
|  | Bluesil FLD 47V50 | 1 |  |
|  | Colorona Blackstar Green | 2 |  |
|  | MTES | 39.23 |  |
|  | Acetic acid | 2 |  |
|  | Total | 100 |  |

Primer/exp270_6

| A2 | Components | Weight (g) |
|---|---|---|
| Part A | Bindzil exp270/6 | 30. |
|  | Water | 10 |
|  | Isopropanol | 4.5 |
|  | Bluesil FLD 47V50 | 1 |
|  | Bayferrox Schwarz 303 T | 20 |
| Part B | MTES | 33.89 |
|  | Formic acid | 0.5 |
|  | Total | 100 |

Top-coat/exp270_6

| C2 | Components | Weight (g) |
|---|---|---|
| Part A | Bindzil exp270/6 | 41. |
|  | Water | 0 |
|  | Isopropanol | 5 |
|  | Butylglycol | 10 |
|  | Bluesil FLD 47V50 | 1 |
|  | Colorona Blackstar Green | 2 |
| Part B | MTES | 38.46 |
|  | Acetic acid | 2 |
|  | Total | 100 |

Primer/exp270_7

| A3 | Components | Weight (g) |
|---|---|---|
| Part A | Bindzil exp270/7 | 30. |
|  | Water | 10 |
|  | Isopropanol | 4.5 |
|  | Bluesil FLD 47V50 | 1 |
|  | Bayferrox Schwarz 303 T | 20 |
| Part B | MTES | 33.32 |
|  | Formic acid | 0.5 |
|  | Total | 100 |

Top-coat/exp270_7

| C3 | Components | Weight (g) |
|---|---|---|
| Part A | Bindzil exp270/7 | 42. |
|  | Water | 0 |
|  | Isopropanol | 5 |
|  | Butylglycol | 10 |
|  | Bluesil FLD 47V50 | 1 |
|  | Colorona Blackstar Green | 2 |
| Part B | MTES | 37.69 |
|  | Acetic acid | 2 |
|  | Total | 100 |

Primer/exp270_8

| A4 | Components | Weight (g) |
|---|---|---|
| Part A | Bindzil exp270/8 | 31. |
|  | Water | 10 |
|  | Isopropanol | 4.5 |
|  | Bluesil FLD 47V50 | 1 |
|  | Bayferrox Schwarz 303 T | 20 |

TABLE 6-continued

SERIE 2
Primer based on Bindzil 30/360
Top-coat based Bindzil 30/360

|  |  |  |
|---|---|---|
| Part B | MTES | 32.78 |
|  | Formic acid | 0.5 |
|  | Total | 100 |

Top-coat/exp270_8

| C4 | Components | Weight (g) |
|---|---|---|
| Part A | Bindzil exp270/8 | 43. |
|  | Water | 0 |
|  | Isopropanol | 5 |
|  | Butylglycol | 10 |
|  | Bluesil FLD 47V50 | 1 |
|  | Colorona Blackstar Green | 2 |
| Part B | MTES | 36.92 |
|  | Acetic acid | 2 |
|  | Total | 100 |

TABLE 7

SERIE 3
Primer based on Bindzil 40/170
Top-coat based Bindzil 40/170

Primer/REF B40

| D | Components | Weight (g) |
|---|---|---|
| Part A | Colloidal silica Bindzil 40/170 | 21.75 |
|  | Water | 17.25 |
|  | Isopropanol | 4.5 |
|  | Bluesil FLD 47V50 | 1 |
|  | Bayferrox Schwarz 303 T | 20 |
| Part B | MTES | 35 |
|  | Formic acid | 0.5 |
|  | Total | 100 |

Top-coat/REF B40

| B | Components | Weight (g) |
|---|---|---|
| Part A | Colloidal silica Bindzil 40/170 | 30 |
|  | Water | 10 |
|  | Isopropanol | 5 |
|  | Butylglycol | 10 |
|  | Bluesil FLD 47V50 | 1 |
|  | Colorona Blackstar Green | 2 |
| Part B | MTES | 40 |
|  | Acetic acid | 2 |
|  | Total | 100 |

Primer/exp270_1

| D1 | Components | Weight (g) |
|---|---|---|
| Part A | Bindzil exp270/1 | 22. |
|  | Water | 17.25 |
|  | Isopropanol | 4.5 |
|  | Bluesil FLD 47V50 | 1 |
|  | Bayferrox Schwarz 303 T | 20 |
| Part B | MTES | 34.74 |
|  | Formic acid | 0.5 |
|  | Total | 100 |

TABLE 7-continued

SERIE 3
Primer based on Bindzil 40/170
Top-coat based Bindzil 40/170

Top-coat/exp270_1

| B1 | Components | Weight (g) |
|---|---|---|
| Part A | Bindzil exp270/1 | 30. |
| | Water | 10 |
| | Isopropanol | 5 |
| | Butylglycol | 10 |
| | Bluesil FLD 47V50 | 1 |
| | Colorona Blackstar Green | 2 |
| Part B | MTES | 39.64 |
| | Acetic acid | 2 |
| | Total | 100 |

Primer/exp270_2

| D2 | Components | Weight (g) |
|---|---|---|
| Part A | Bindzil exp270/2 | 22. |
| | Water | 17.25 |
| | Isopropanol | 4.5 |
| | Bluesil FLD 47V50 | 1 |
| | Bayferrox Schwarz 303 T | 20 |
| Part B | MTES | 34.47 |
| | Formic acid | 0.5 |
| | Total | 100 |

Top-coat/exp270_2

| B2 | Components | Weight (g) |
|---|---|---|
| Part A | Bindzil exp270/2 | 30. |
| | Water | 10 |
| | Isopropanol | 5 |
| | Butylglycol | 10 |
| | Bluesil FLD 47V50 | 1 |
| | Colorona Blackstar Green | 2 |
| Part B | MTES | 39.28 |
| | Acetic acid | 2 |
| | Total | 100 |

Primer/exp270_3

| D3 | Components | Weight (g) |
|---|---|---|
| Part A | Bindzil exp270/3 | 22. |
| | Water | 17.25 |
| | Isopropanol | 4.5 |
| | Bluesil FLD 47V50 | 1 |
| | Bayferrox Schwarz 303 T | 20 |
| Part B | MTES | 34.21 |
| | Formic acid | 0.5 |
| | Total | 100 |

Top-coat/exp270_3

| B3 | Components | Weight (g) |
|---|---|---|
| Part A | Bindzil exp270/3 | 31. |
| | Water | 10 |
| | Isopropanol | 5 |
| | Butylglycol | 10 |
| | Bluesil FLD 47V50 | 1 |
| | Colorona Blackstar Green | 2 |
| Part B | MTES | 38.92 |
| | Acetic acid | 2 |
| | Total | 100 |

Primer/exp270_4

| D4 | Components | Weight (g) |
|---|---|---|
| Part A | Bindzil exp270/4 | 22. |
| | Water | 17.25 |
| | Isopropanol | 4.5 |
| | Bluesil FLD 47V50 | 1 |
| | Bayferrox Schwarz 303 T | 20 |
| Part B | MTES | 33.94 |
| | Formic acid | 0.5 |
| | Total | 99.99 |

Top-coat/exp270_4

| B4 | Components | Weight (g) |
|---|---|---|
| Part A | Bindzil exp270/4 | 31. |
| | Water | 10 |
| | Isopropanol | 5 |
| | Butylglycol | 10 |
| | Bluesil FLD 47V50 | 1 |
| | Colorona Blackstar Green | 2 |
| Part B | MTES | 38.55 |
| | Acetic acid | 2 |
| | Total | 100 |

The kit compositions shown in table 5-7 were used to prepare double layer (primer and top-coat) coatings on a substrate.

For each respective layer coating, the components for part A are mixed, the mixing was done in a container rotated at for e.g. 80 rpm on a jar mill for approximately 20 mins. The components for part B are mixed, the mixing was done in a container rotated at for e.g. 80 rpm on a jar mill for approximately 20 mins.

For each respective layer coating, the mixture for part A and the mixture for part B are then combined in a mixer at room temperature (for example a blade mixer, or a container that will be rotated at e.g. 80 rpm on a jar mill) for approximately 20 mins in order to initiate the silane hydrolysis reaction. The resulting mixture for each respective layer coating was then allowed to mature for at least 24 hours with gentle agitation at room temperature. The mixture for each respective layer coating was then filtered through a stainless steel mesh having apertures of 125 microns. The mixture for each respective layer coating layer was then applied with a pneumatic spray gun, on an aluminium substrate which had been sandblasted, degreased, and heated to a temperature of 60° C. to facilitate application of the mixture on the aluminium substrate.

The two coating layers (primer coating and top-coat coating) were applied wet-on-wet (humid thicknesses: primer coating≈55 μm, top-coat coating≈20 μm) on the aluminium substrate. The coated aluminium substrate was then cured for 15 minutes at 250° C. to form the double layer coatings on the aluminium substrate.

Various properties of the double layer coatings manufactured from the kit compositions according to the present invention were analysed, such as pencil hardness, impact and scratch resistances and non-stick properties.

5a—Pencil Hardness

Pencil hardness measurements used by the coatings industry was used to determine the hardness of the double layer coatings. Pencil hardness of the double layer coatings was evaluated according to ISO 15184 standard 'Paints and Varnishes—Determination of film hardness by pencil test'. This test method was also used to determine the cure of the double layer coatings, when force-dried using heat. The results are shown in table 8.

TABLE 8

| Coatings | Comments | Thickness (μm) | Pencil Hardness | Adherence 1 mm spacing | Adherence 2 mm spacing |
|---|---|---|---|---|---|
| A + B | SERIE 1 | 71.5 ± 8.2 | 8H | 1-2B | 3B |
| A1 + B1 | Primer = | 49.5 ± 4 | 6H | 3B | 4B |
| A2 + B2 | Bindzil 30/360 | 48.9 ± 3.9 | 6H | 3B | 4B |
| A3 + B3 | Top-coat = | 55.9 ± 4.4 | 8H | 2-3B | 4B |
| A4 + B4 | Bindzil 40/170 | 73.7 ± 5.3 | 9H | 1-2B | 3B |
| D + B | SERIE 3 | 65.2 ± 4.5 | 10H | 3B | 4B |
| D1 + B1 | Primer = Bindzil | 66.3 ± 7.1 | 8H | 2-3B | 4B |
| D2 + B2 | 40/170 | 66.1 ± 8.3 | 8H | 2B | 3B |
| D3 + B3 | Top-coat = | 71.0 ± 5.7 | 10H | 2-3B | 4B |
| D4 + B4 | Bindzil 40/170 | 67.7 ± 5.9 | 8H | 2-3B | 4B |

It has to be noted that the pencil hardness noted in table 8 is related to the greatest pencil hardness for which the pencil left the double layer coating surface intact without any pencil traces and/or cuts. The pencil hardness, adherence results for SERIE 1 and SERIE 3 systems are listed in table 9 as well as the dry double layer coating thickness. SERIE 2 systems could not be applied and characterised due to a premature gelation of the top-coat coating layer.

SERIE 3 systems are characterised by higher pencil hardness compared to those of the SERIE 1 systems. For the SERIE 1 systems, highest pencil hardness is obtained for the A4+B4 double layer coatings and the lowest for the A1+B1 and A2+B2 double layer coatings. The methylsilyl derivatised silica particles according to the present invention affects the final results. Optimal results are pronounced in the double layers coatings which comprise with the greatest degree of methylsilyl content on a surface of the silica particles.

The systems of the SERIE 3 give characteristic values of very hard coatings between 8H and 10H. D+B and D3+B3 double layer coatings reach 10H which is the highest pencil hardness.

Improved adherences of the double layer coatings on the substrate were obtained for the SERIE 3 systems compared to those related to the SERIE 1 systems. 1 mm spacing cross-cut tests are more severe and discriminant. The obtained results (B3/4B double layer coatings) can be considered as relatively good regarding the internal stresses developed during the formation of the double layer coatings. D+B and D3+B3 double layer coatings are those which give the optimal performance in terms of adherence and pencil hardness.

5b—Scratch Resistance

Scratch resistance was measured according to ISO 1518 standard "Paints and varnishes—Determination of scratch resistance". This procedure specifies a test method for determining under defined conditions the resistance of the double layer coatings to penetration by scratching with a scratch stylus loaded with a specified load. A weight-loaded ball-shaped carbide tool (tungsten carbide 1 mm diameter) was applied with a defined force (0 to 50N) to the double layer coated substrate, which is moved with a constant speed. The scratch hardness is measured by the force necessary to cut through the double layer coating to the substrate.

Figure 1:
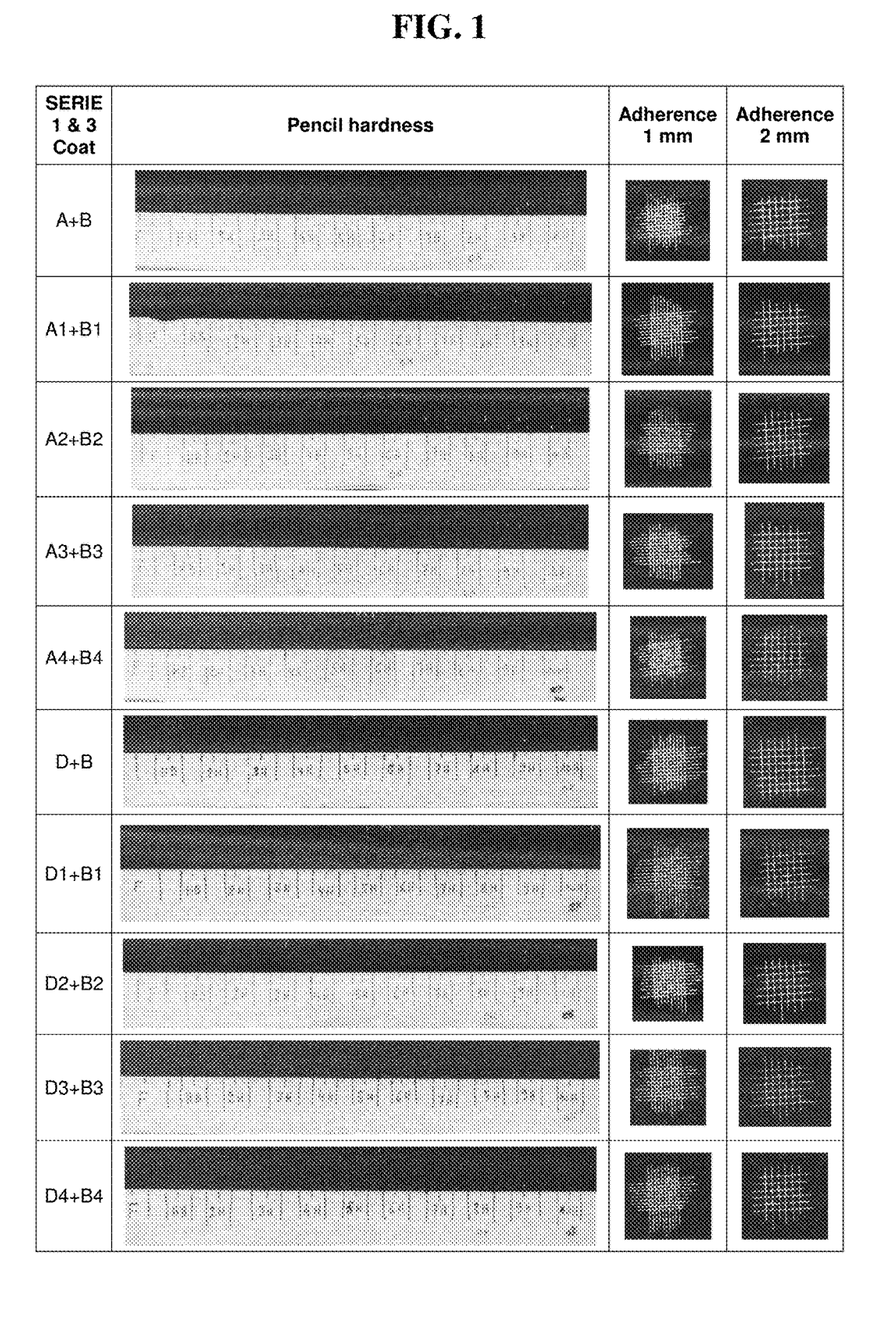
FIG. 1 illustrates pencil hardness and adherence results for double layer coatings.
Figure 2A:
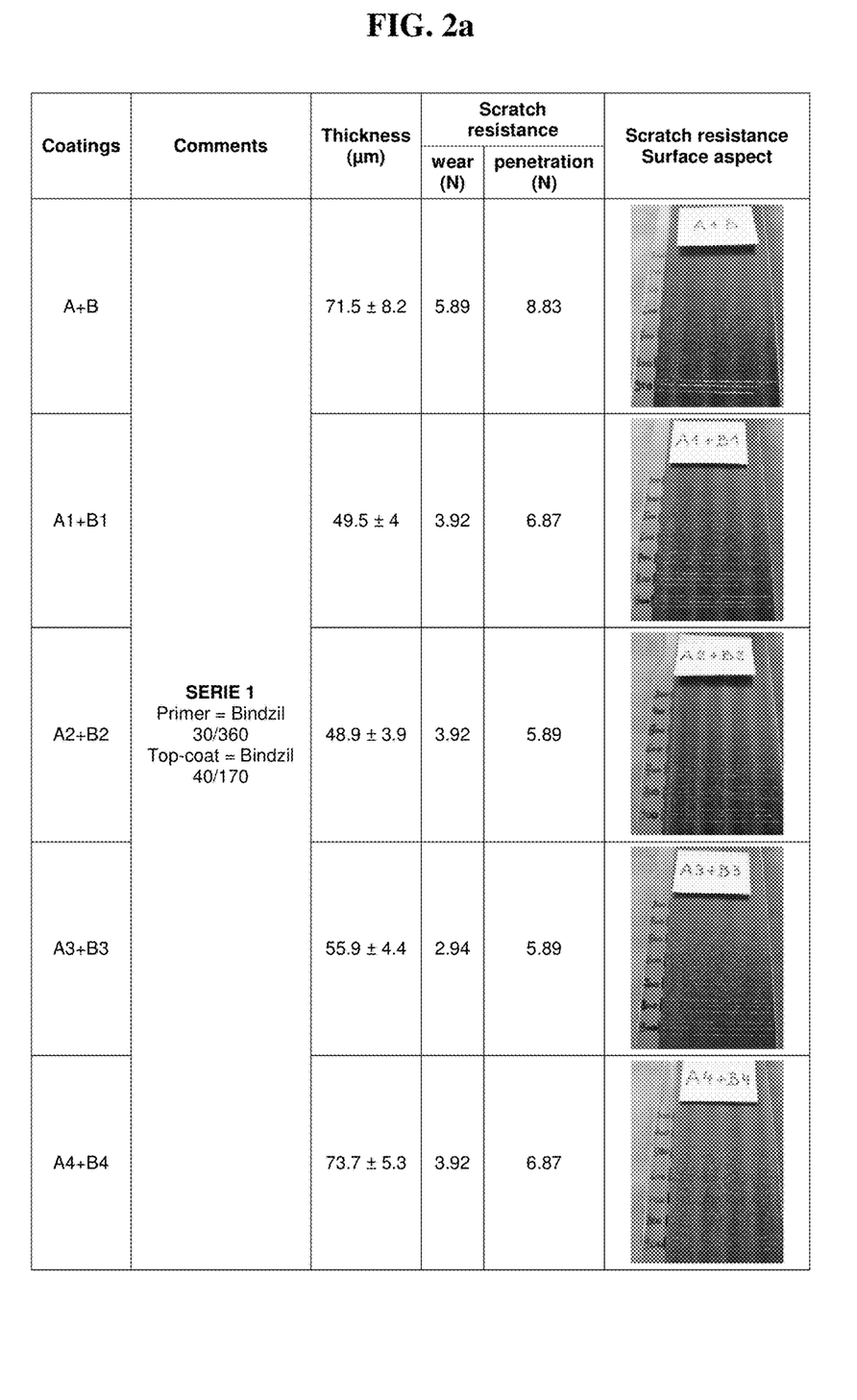
FIGS. 2a and 2b illustrate scratch resistance results for double layer coatings.
Figure 2B:
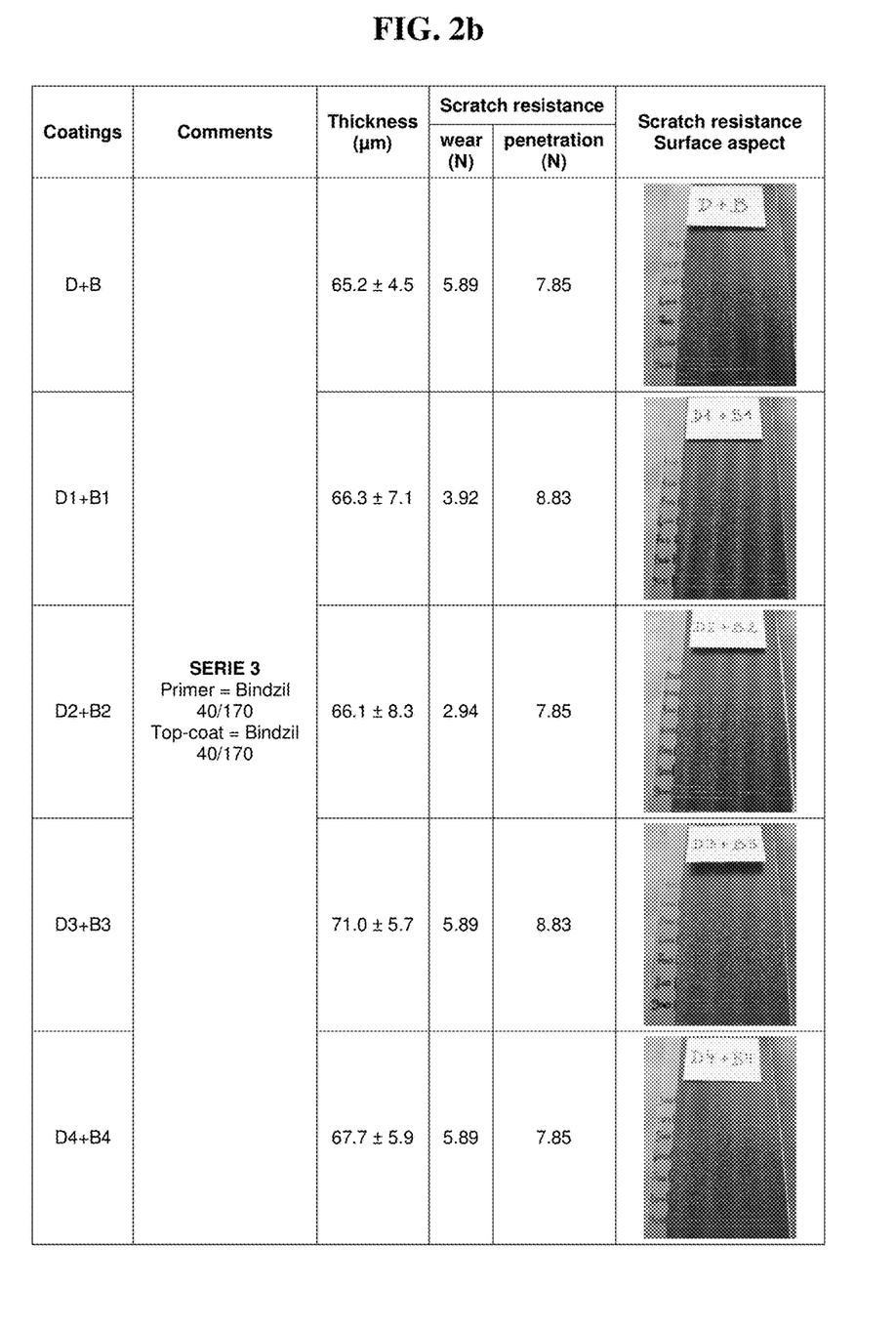

Scratch resistance evaluations are given in FIGS. 2a and 2b as well as the surface aspects of the double layer coatings after the scratch test. Scratch resistance has been rated in terms of the force applied by the tool to leave a trace on the double layer coated substrate surface without cutting through the double layer coating (wear) and the force applied by the tool on the coating surface to cut through the double layer coatings (penetration). Optimum results are observed for double layer coatings of the SERIE 3 double layer coating, in which the required forces to cut through the double layer coatings, are higher. Moreover, the SERIE 3 double layer coatings seem to be less affected by the ball-shaped tool and are less sensitive to scratching. The SERIE 1 double layer coatings appear to be much more brittle in comparison to the SERIE 3 double layer coating.

The methylsilyl derivatised silica particles therefore induces differences regarding the wearing resistance for D1+B1 and D2+B2 double layer coatings in comparison with the other double layer coating.

5c—Non-Stick Properties

Non-stick or release properties of cookware coated with the double layer coatings was evaluated by means of "the egg test" according to a French standard NF D21-511, by the following procedure.

1. The internal side a pan on which the double layer coating is formed is oiled with 2 cm$^3$ vegetable oil, for a pan of a diameter between 240 mm and 280 mm.

2. The pan is cleaned in warm water containing washing-up liquid, then rinsed with warm water, rinsed with cold water and then dried.

3. The adhesion resistance of the double layer coated pan to a cooked egg is then monitored in the pan by a procedure as follows:
   the pan is heated so that its internal surface has a temperature between 150° C. and 170° C.,
   an egg is broken and cooked in the centre of the frying pan without adding further oil for a period of 8 to 9 minutes,
   the egg is then removed,
   the frying pan is left to cool at ambient temperature,
   the frying pan is cleaned with a moist sponge.

The non-stick properties are linked to an ease with which an egg residue of the cooked egg can be removed from the pan. The non-stick properties were scored as follows:
   100 points where the whole egg comes off with a mere wrist shake
   50 points where the whole egg comes off with a spatula without leaving any residue
   25 points where the egg residue comes off by rubbing with a moist sponge
   0 point where the egg residue does not come off with a moist sponge.

The results of the non-stick properties are shown in table 11.

TABLE 11

| Coatings | Comments | Thickness (μm) | Egg Test Score Initial | Egg Test Score Cycle 1 | Egg Test Score Cycle 2 |
|---|---|---|---|---|---|
| A + B | SERIE 1 | 71.5 ± 8.2 | 50 | 50 | 25 |
| A1 + B1 | Primer = Bindzil | 49.5 ± 4 | 50 | 50 | 25 |

TABLE 11-continued

| Coatings | Comments | Thickness (μm) | Egg Test Score | | |
|---|---|---|---|---|---|
| | | | Initial | Cycle 1 | Cycle 2 |
| A2 + B2 | 30/360 | 48.9 ± 3.9 | 50 | 25 | 25 |
| A3 + B3 | Top-coat = Bindzil | 55.9 ± 4.4 | 50 | 50 | 25 |
| A4 + B4 | 40/170 | 73.7 ± 5.3 | 50 | 50 | 50 |
| D + B | SERIE 3 | 65.2 ± 4.5 | 50 | 50 | 25 |
| D1 + B1 | Primer = Bindzil | 66.3 ± 7.1 | 50 | 50 | 25 |
| D2 + B2 | 40/170 | 66.1 ± 8.3 | 50 | 25 | 25 |
| D3 + B3 | Top-coat = Bindzil | 71.0 ± 5.7 | 50 | 50 | 50 |
| D4 + B4 | 40/170 | 67.7 ± 5.9 | 50 | 50 | 25 |

A spatula is always needed to initiate detaching the cooked egg from the pan. There is no difference between all tested systems; 50 points (spatula) were attributed to all tested double layer coatings. After 1 cooking cycle, two coating systems A2+B2 and D2+B2 have fallen in score, some residues are present on the coated surface of the frying pan after removing the whole egg. All residues are rapidly removed with a moist sponge. After 2 cocking cycles, only two systems (A4+B4 and D3+B3) perform well.

Overall, the test results show that the mechanical properties of the non-stick coatings are mostly improved where methylsilyl derivatised silica particles systems with a wide particle size distribution is used compared with when methylsilyl derivatised silica particles systems with a narrower particle size distribution is used.

Having thus described the present invention and the advantages thereof, it should be appreciated that the various aspects and embodiments of the present invention as disclosed herein are merely illustrative of specific ways to make and use the invention.

The various aspects and embodiments of the present invention do not limit the scope of the invention when taken into consideration with the appended claims and the forgoing detailed description.

What is desired to be protected by Letters Patent is set forth in the following claims.

The invention claimed is:

1. A method for the manufacture of methylsilyl derivatised silica particles, the method comprising:
    providing a colloidal silica,
    maintaining the colloidal silica at a temperature in the range of from 50 to 90° C.,
    adding to the colloidal silica a methyl alkoxysilane whilst maintaining the temperature in range of from 50 to 90° C. in an amount to provide a methylsilyl content in a range of from 1 to 6 μmol m$^{-2}$ on a surface of the silica particles; and wherein the methyl alkoxysilane is added at a dosing rate in the range of from 0.2 to 2 μmol methyl alkoxysilane/(m$^2$·h).

2. The method according to claim 1, wherein the colloidal silica comprises at least one of ethanol, methanol, isopropanol, acetone or mixtures thereof.

3. The method according to claim 1, wherein the methyl alkoxysilane is selected from one of methyltriethoxysilane, methyltrimethoxysilane or dimethyldiethoxysilane.

4. The method according to claim 1, wherein the methyl alkoxysilane is added over a period of more than 2 minutes.

5. A kit for a primer coating comprising a two-pack system comprising as separate parts a first pack and second pack, wherein the first pack comprises based on wt %:
    A colloidal silica 25-35 wt %, wherein the colloidal silica comprises at least 30 wt % methylsilyl derivatised silica particles with a methylsilyl content in a range of from 1 to 6 μmol m$^{-2}$ on a surface of the silica particles,
    Water 10-15 wt %,
    Alcohol 1-5 wt %,
    Silicon oil 0.1-2 wt %,
    Pigments 20-25 wt %, and
wherein the second pack comprises based on wt %:
    Methyl alkoxysilane 30-35 wt %,
    Acid 0.5-1 wt %.

6. The kit according to claim 5, wherein the methyl alkoxysilane is selected from one of methyltriethoxysilane, methyltrimethoxysilane or dimethyldiethoxysilane.

7. A kit for a top-coat coating comprising a two-pack system comprising as separate parts a first pack and second pack, wherein the first pack comprises based on wt %:
    A colloidal silica 25-30 wt %, wherein the colloidal silica comprises at least 40 wt % methylsilyl derivatised silica particles with a methylsilyl content in a range of from 1 to 6 μmol m$^{-2}$ on a surface of the silica particles,
    Water 10-15 wt %,
    Alcohol 1-5 wt %,
    Co-solvent 5-15 wt %
    Silicon oil 0.1-2 wt %,
    Pigments 0.1-15 wt %, and
wherein the second pack comprises based on wt %:
    Methyl alkoxysilane 35-45 wt %,
    Acid 1-2 wt %.

8. The kit according to claim 5, wherein the alcohol is selected from one of iso-propanol, methanol, ethanol or propanol or any combination thereof.

9. The kit according to claim 5, wherein the silicon oil is one of a food grade silicon oil or a non-food grade silicon oil.

10. The kit according to claim 5, wherein the pigments are selected from one of organic pigments or inorganic pigments or any combination thereof.

11. The kit according to claim 5, wherein the acid is selected from one of acetic acid, formic acid, phosphoric acid, hydrochloric acid, nitric acid, sulphuric acid or propionic acid.

12. The kit according to claim 7, wherein the alcohol is selected from one of iso-propanol, methanol, ethanol or propanol or any combination thereof.

13. The kit according to claim 7, wherein the silicon oil is one of a food grade silicon oil or a non-food grade silicon oil.

14. The kit according to claim 7, wherein the pigments are selected from one of organic pigments or inorganic pigments or any combination thereof.

15. The kit according to claim 7, wherein the acid is selected from one of acetic acid, formic acid, phosphoric acid, hydrochloric acid, nitric acid, sulphuric acid or propionic acid.

16. The kit according to claim 7, wherein the methyl alkoxysilane is selected from one of methyltriethoxysilane, methyltrimethoxysilane or dimethyldiethoxysilane.

* * * * *